United States Patent

Campbell et al.

[11] Patent Number: 6,042,310
[45] Date of Patent: Mar. 28, 2000

[54] BIT ATTACHING ARRANGEMENT FOR POWER TOOL

[75] Inventors: David C. Campbell, Bel Air; Gale A. Heslop, Carney, both of Md.

[73] Assignee: Black & Decker, Inc., Newark, Del.

[21] Appl. No.: 08/980,522

[22] Filed: Dec. 1, 1997

[51] Int. Cl.[7] .................................................. B23C 1/20
[52] U.S. Cl. ............................ 409/131; 279/62; 279/150; 408/240; 409/182
[58] Field of Search .................... 279/48, 49, 62, 279/150, 902; 409/131, 232, 234, 181, 182; 408/238, 239 R, 240, 197

[56] References Cited

U.S. PATENT DOCUMENTS

| | | | |
|---|---|---|---|
| 210,875 | 12/1878 | Pierce | 279/62 |
| 847,336 | 3/1907 | Holmberg | 279/62 |
| 872,841 | 12/1907 | North | 279/62 |
| 913,059 | 2/1909 | Savage | 279/62 |
| 1,750,023 | 3/1876 | Prigan | 279/902 |
| 1,816,239 | 7/1931 | Hamersveld et al. . | |
| 2,807,732 | 9/1957 | Kurtovich . | |
| 2,897,302 | 7/1959 | Godfrey et al. . | |
| 3,008,723 | 11/1961 | Caldwell . | |
| 3,443,479 | 5/1969 | Hawley et al. . | |
| 3,447,001 | 5/1969 | Zelik . | |
| 3,487,747 | 1/1970 | Burrows et al. . | |
| 3,587,387 | 6/1971 | Burrows et al. . | |
| 3,767,948 | 10/1973 | Batson . | |
| 3,811,361 | 5/1974 | Seely et al. . | |
| 4,324,512 | 4/1982 | Siroky . | |
| 4,386,879 | 6/1983 | Martinmaas . | |
| 4,389,146 | 6/1983 | Coder . | |
| 4,400,995 | 8/1983 | Palm . | |
| 4,461,330 | 7/1984 | Judkins . | |
| 4,526,497 | 7/1985 | Hatfield . | |
| 4,536,113 | 8/1985 | Hatfield . | |
| 4,586,859 | 5/1986 | Rohm | 408/240 |
| 4,652,187 | 3/1987 | Regelsberger et al. . | |
| 4,682,918 | 7/1987 | Palm . | |
| 4,718,797 | 1/1988 | Purviance . | |
| 4,804,048 | 2/1989 | Porth, Jr. . | |
| 4,915,555 | 4/1990 | Smothers . | |
| 4,999,018 | 3/1991 | Wenz, Jr. | 408/241 R |
| 5,009,539 | 4/1991 | Mulelenberg | 279/49 |
| 5,030,044 | 7/1991 | Eros . | |
| 5,191,968 | 3/1993 | McCurry . | |
| 5,342,154 | 8/1994 | Holzer . | |
| 5,496,139 | 3/1996 | Ghode et al. . | |
| 5,531,549 | 7/1996 | Fossella . | |
| 5,620,188 | 4/1997 | McCurry et al. . | |
| 5,800,102 | 9/1998 | Taber | 408/241 R |

OTHER PUBLICATIONS

Patent Abstract, No. SU 1484980, dated Jun. 1989.

*Primary Examiner*—Daniel W. Howell
*Attorney, Agent, or Firm*—Shook, Hardy & Bacon L.L.P.

[57] ABSTRACT

A bit attaching arrangement for a power tool includes a bit locking member rotatable with respect to the output shaft of the power tool. A first gear is fixed to the bit locking member so that rotation of the first gear causes rotation of the locking member. A second gear is fixed to the output shaft so that rotation of the second gear causes rotation of the output shaft. A third gear engages both said first and second gear simultaneously and is capable of rotation by an operator of the power tool. Rotation of the third gear results in counter rotation between the bit locking member and the output shaft so as to result in securement of the bit to the shaft. A further aspect of the invention includes a pinion shaft onto which the third gear is mounted. The pinion shaft is slidably mounted to the power tool so that the third gear may be moved between a position where it engages both the first and second gears and can be used to tighten the bit in place, and a second position wherein it does not engage either of the gears and allows operation of the power tool.

40 Claims, 2 Drawing Sheets

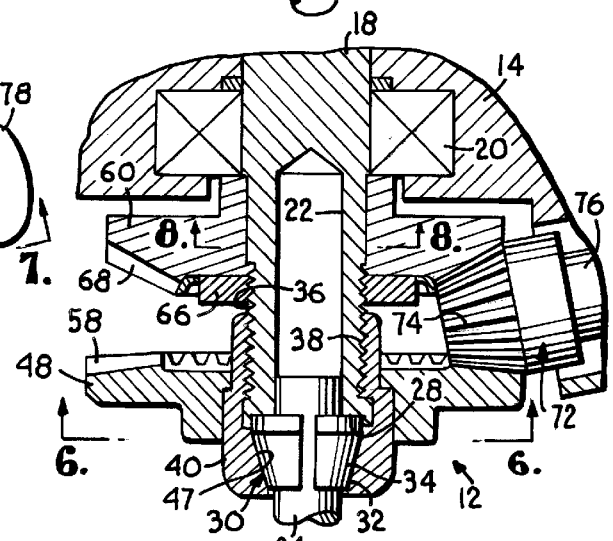
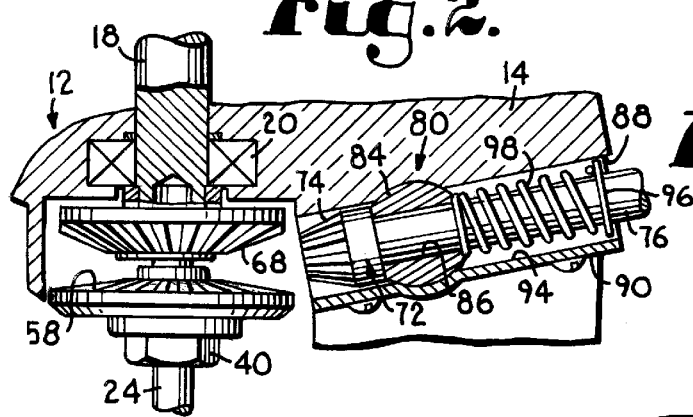
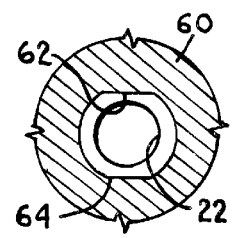
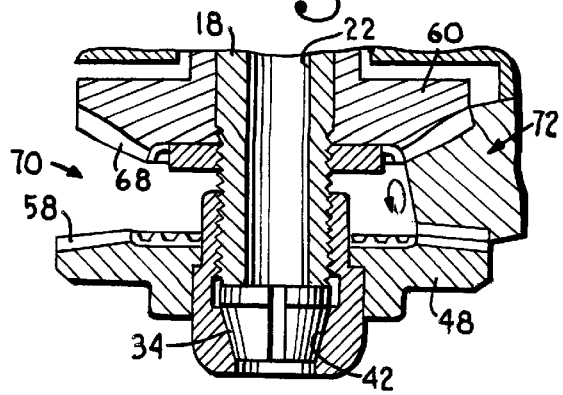
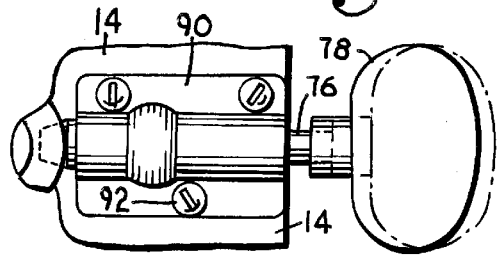

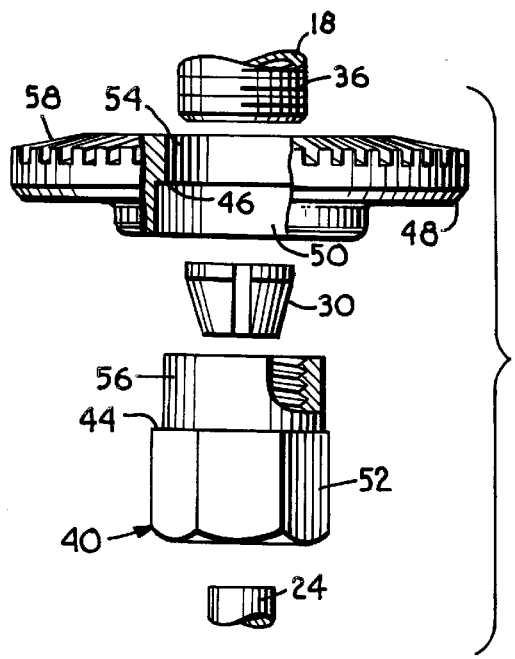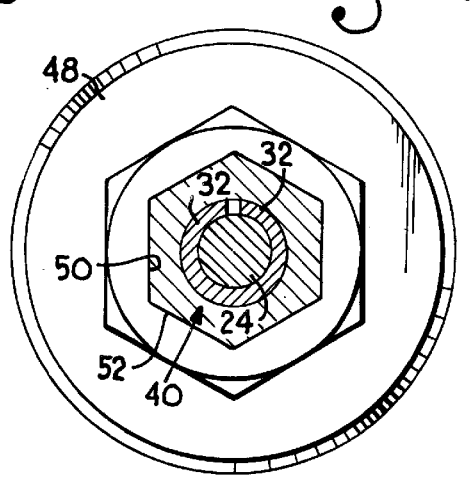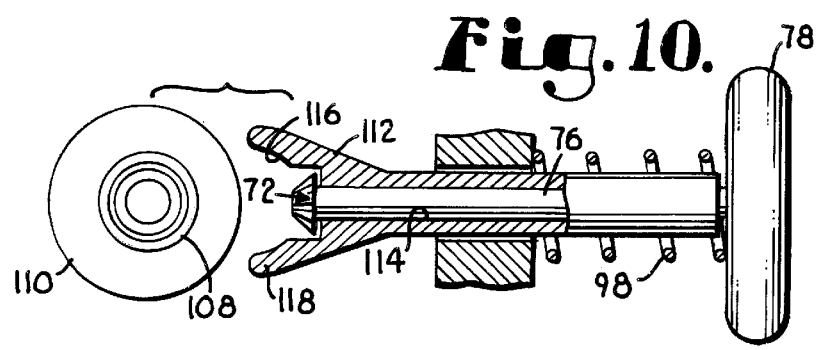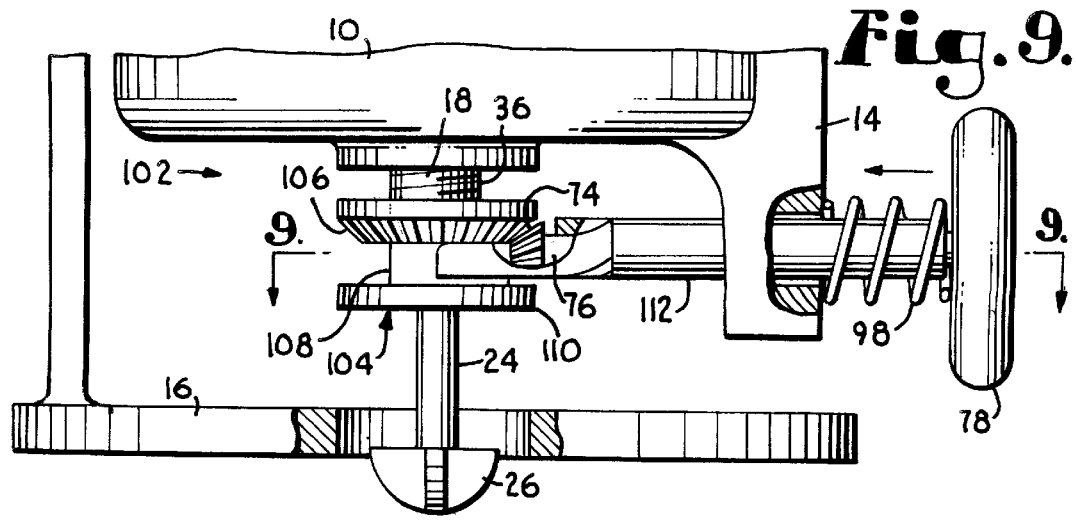

BIT ATTACHING ARRANGEMENT FOR POWER TOOL

BACKGROUND OF THE INVENTION

This invention relates to a bit attaching arrangement for a power tool, and, more particularly, to an arrangement that allows the bit to be attached without the use of external wrenches or keys.

Power tools, such as routers, often incorporate a collet for holding the shank end of a bit in place on the lower end of a rotating armature/output shaft. In particular, the collet consists of a generally cone-shaped structure having a split end which defines separate prongs which are usually biased slightly radially outwardly. The end of the collet opposite the prongs is generally attached to or formed integrally with the output shaft of the router. A collet locking nut is used to secure a bit onto the output shaft. The collet nut has a female thread surface which engages a male thread surface located on the lower end of the output shaft. The collet nut fits over the collet and has a female cone-shaped camming surface for engaging the cone-shaped outer surface of the collet.

In order to attach a bit to a router utilizing this well-known structure, the shank of the bit is positioned between the prongs of the collet with the collet nut in a loosened position on the output shaft. After the shank of the bit is completely disposed within the hollow output shaft, the collet nut is tightened such that the prongs of the collet engage the side surfaces of the shank and firmly hold the bit in place on the lower end of the shaft. In order to sufficiently tighten the collet nut so as to secure the bit, external and separate tools and/or wrenches are typically utilized. In particular, the tightening operation of this prior art structure often involves utilizing a shaft lock arrangement which prevents rotation of the output shaft of the router and thereafter manually tightening the nut using a dedicated individual wrench which is often included with the router when it is sold.

This prior locking arrangement suffers from numerous disadvantages. First, because the tightening wrench is a separate item, it is often lost or misplaced after the router has been used for a period of time. This often results in an operator utilizing a non-dedicated wrench or pliers to tighten the collet nut. Use of the incorrect sized wrench or pliers may result in damage to the collet nut and/or locking arrangement. Additionally, use of a non-dedicated wrench can also result in the collet nut not being sufficiently tightened causing slippage between the bit and the output shaft.

A further disadvantage is the amount of time it takes to replace a router bit. More specifically, to adequately tighten the collet nut, it requires numerous placement and replacement of the wrench on the collet nut to tighten the nut. This is due to limited access to the attaching arrangement through the guards and support plates of the router. Still further, as mentioned above, to rotate the nut with respect to the output shaft, there oftentimes is a shaft locking mechanism disposed internally within the assembly. This can result in a further disadvantage because of the possibility of the shaft locking mechanism malfunctioning and impeding the rotation of the output shaft. Another disadvantage of utilizing an internal spindle lock is that typically the lock will only prevent the output shaft from rotation when the shaft is at predetermined rotational locations. In particular, there are indentations in the shaft which are engaged by the lock and an indentation must be aligned with the lock mechanism before the shaft can be secured.

Therefore, a bit locking arrangement is needed which will overcome the problems discussed above.

SUMMARY OF THE INVENTION

Accordingly, it is an object of the present invention to provide a locking arrangement for a power tool which does not require any external wrenches or tools to secure the bit to the outlet shaft of the power tool.

Another object of the present invention is to provide a locking arrangement which does not require a separate spindle lock for maintaining the output shaft stationary as the tightening nut of the arrangement is turned.

A further object of the present invention is to provide a locking arrangement wherein the bit can be tightened or loosened no matter the rotational orientation of the output shaft.

A still further object of this invention is to provide a bit locking arrangement which is self-contained within the power tool and which provides for rotation of a locking member, even as the locking member moves longitudinally along the output shaft of the power tool during the tightening and loosening processes.

A still further object of the present invention is to provide a self-contained locking arrangement which results in more efficient tightening and loosening by taking advantage of counter rotation of the output shaft and the locking member.

Accordingly, the present invention provides for a bit attaching arrangement having a bit locking member rotatable with respect to an output shaft of a power tool. A first gear is fixed to the bit locking member so that rotation of the first gear causes rotation of the locking member. A second gear is fixed to the output shaft so that rotation of the second gear causes rotation of the output shaft. A third gear engages both the first and second gears simultaneously, and is capable of rotation by the power tool operator. When the third gear is rotated by the operator, the bit locking member and the shaft counter rotate with respect to one another to result in securement and loosening of the bit to the output shaft.

This invention further provides for structure that moves the third gear between a first position where it engages the first and second gears resulting in tightening and loosening of the power tool and a second position wherein the first and second gears are not engaged so that the third gear does not interfere with operation of the power tool.

Additional objects, advantages and novel features of the invention will be set forth in part in the description which follows, and in part will become apparent to those skilled in the art upon examination of the following, or may be learned by practice of the invention.

BRIEF DESCRIPTION OF THE DRAWINGS

In the accompanying drawings which form a part of this specification and are to be read in conjunction therewith and in which like reference numerals arc used to indicate like parts in the various views:

FIG. 1 is a front elevational view of a router, with a bit locking arrangement embodying the principals of this invention;

FIG. 2 is a cross-sectional view of the area designated by the numeral "2" in FIG. 1, portions of the outer housing of the router have been broken away and shown in cross section to reveal the details of construction of the locking arrangement, and the pinion shaft of the arrangement shown in its disengaged position so as to allow operation of the router;

FIG. 3 is a view similar to FIG. 2, but further showing the structure of the locking arrangement in cross section, and also showing the pinion shaft engaging the gears of the locking arrangement so as to effectuate tightening and loosening of a bit in the locking arrangement;

FIG. 4 is a view similar to FIG. 3 showing the locking arrangement in a loosened position prior to insertion of the shank of a bit;

FIG. 5 is an exploded view of a portion of the bit locking arrangement including the lower gear, collet, and collet nut;

FIG. 6 is a cross-sectional view taken generally along line 6—6 of FIG. 3;

FIG. 7 is a cross-sectional view taken generally along line 7—7 of FIG. 1;

FIG. 8 is a cross section taken generally along line 8—8 of FIG. 3.

FIG. 9 is a side elevational view of a second embodiment of a locking mechanism embodying the principles of this invention, parts being broken away and shown in cross section to reveal details of construction, and the pinion shaft of the locking arrangement shown in an engaging operating position; and FIG. 10 is a cross-sectional view taken generally along line 9—9 of FIG. 8 and showing the locking arrangement of FIG. 9 in a disengaged position.

DETAILED DESCRIPTION OF THE PREFERRED EMBODIMENTS

Referring to the drawings in greater detail and initially to FIGS. 1–3, a router 10 having a bit locking arrangement 12 according to the present invention is shown. Router 10 includes a housing 14 mounted to a generally horizontal support plate 16. Contained within housing 14 is a motor (not shown) which rotates a generally cylindrical armature or output shaft 18. Shaft 18 is supported in housing 14 by bearing assembly 20. Shaft 18 has a cylindrical bit receiving bore 22 formed on an exposed end. Bore 22 is configured to receive a shank portion 24 of a bit 26, as is shown in FIG. 3. Shaft 18 further has a generally annular receiving area 28 formed on its lower end for maintaining a collet 30 thereon. Collet 30 includes connected generally semicircular prongs 32 (as best shown in FIG. 6), each having an inclined outer surface 34. Prongs 32 of collet 30 surround shank 24 of bit 26, as best shown in FIGS. 3 and 6, such that the interior surface of prongs 32 engage shank 24 to secure bit 26 in position, as will be more fully described below. Although collet 30 is shown as a separate piece from shaft 18, it may be desirable and is within the scope of this invention to form collet 30 integral with the bottom of output shaft 18.

Shaft 18 further has outer thread surface 36 located adjacent its lower end. Thread surface 36 engages female thread surface 38 of a collet nut 40 such that nut 40 can be tightened and loosened on the lower end of shaft 18 to secure bit 26 in place as will be more fully described. Nut 40 further has a generally conical inner camming surface 42 for engaging the inclined surfaces 34 of prongs 32 such that upward movement of nut 40 on shaft 18 results in prongs 32 being forced inwardly to tightly engage shank 24 and secure bit 26 in position, as is best shown in FIG. 3.

With reference to FIGS. 3 and 5, nut 40 further includes an outer annular ridge 44 which engages an inner ridge 46 of a lower actuating gear 48 when gear 48 and nut 40 are press-fitted together. More specifically, gear 48 has an interior surface 50 which conforms to the exterior hexagonal surface 52 of nut 40. Gear 48 further has a generally cylindrical interior surface 54 which engages the generally cylindrical exterior surface 56 of nut 40. As indicated above, nut 40 and gear 48 are press-fitted together such that rotation of gear 48 will result in rotation of nut 40. The engagement of hexagonal surface 50 of the gear with hexagonal surface 52 of the nut ensures that the gear and nut will rotate together. Gear 48 further has an annular beveled gear surface 58 which will be utilized to rotate nut 40, as will be more fully described below.

Arrangement 12 further includes an upper gear 60. Upper gear 60 is secured on the outer surface of shaft 18 such that rotation of gear 60 will result in rotation of shaft 18. In particular, gear 60 is keyed to shaft 18 via interior flat surfaces 62 on gear 60 and exterior flat surfaces 64 on shaft 18, as best shown in FIG. 8. Gear 60 is secured at its vertical location on shaft 18 via nut 66 which also engages thread surface 36 of shaft 18, as best shown in FIG. 3. Gear 60, as with gear 48, also has a beveled gear surface 68. The beveled gear surfaces of gear 48 and gear 60 form a beveled annular "envelope" 70 into which a beveled pinion gear 72 can be received. Pinion gear 72 has annular beveled gear surface 74 for engaging the respective gear surfaces of gears 48 and 60. Rotation of gear 72 results in counter rotation between gears 48 and 60 which thus results in counter rotation between shaft 18 and nut 40. Thus, depending upon which direction pinion gear 72 is rotated, such rotation can result in tightening or loosening of collet nut 40.

With reference to FIGS. 2 and 7, pinion gear 72 can be rotated by a router operator via pinion shaft 76 and actuating knob 78. In particular, shaft 76 is slidably and rotatably mounted to housing 14 via a spherical bearing assembly 80. Assembly 80 includes a spherical bearing 84 having an inner bore 86 for slidably receiving pinion shaft 76 therethrough. Bearing 84 is held in position relative to housing 14 by a semicircular indentation 88 formed in housing 14 and a bearing plate 90 attached to housing 14 via screws 92. Plate 90 also has a generally semicircular indentation 94 mating with indentation 88 of housing 14 to form the receiving structure for bearing 84 and shaft 76.

Also disposed on shaft 76 is a retaining collar 96. A spiral spring 98 is positioned between one end of bearing 84 and collar 96. Spring 98 is preferably slightly compressed when positioned between collar 96 and bearing 84 such that when knob 78 is not actuated by an operator, gear 72 will abut bearing 84 and be completely disengaged from gears 48 and 60, as best shown in FIG. 2. This position is the disengaged position of arrangement 12. In particular, this disengaged position allows uninhibited rotation of bit 26 to act upon the workpiece and perform cutting operations.

Arrangement 12 further has a lockout lever 100 pivotally mounted to housing 14, as best shown in FIG. 1. In FIG. 1, lever 100 is shown in its locked position to prevent an operator from pushing inwardly on knob 78 to engage gear 72 with gears 48 and 60. In order to engage gear 72 with the other gears, an operator must first rotate lever 100 upwardly as indicated by the arrow in FIG. 1. As is apparent when shaft 76 moves to its outward position (corresponding to gear 72 being disengaged), gravity will rotate lever 100 downwardly to again lock gear 72 in its disengaged position. Additionally, bit changing of router 10 often occurs with the router in an upside down position. As the router is inverted to change bit 26, lever 100 becomes automatically disengaged due to gravity. After the bit is changed and the router is right sided, lever 100 returns to its locked position due to gravity.

In operation, arrangement 12 is first found in its untightened open position shown in FIG. 4. More specifically, in this position, prongs 32 of collet 30 are not yet being forced inwardly by the engagement between inclined surfaces 34 and camming surface 42 of nut 40. Thus, a shank 24 of bit 26 can be inserted through collet 30 and received in bore 22 of shaft 18. In order to secure bit 26 in place on shaft 18, an operator first rotates lockout lever 100 upwardly and pushes inwardly on knob 78 such that pinion gear 72 engages lower gear 48 and upper gear 60. As is also apparent, if the router is inverted prior to bit attachment, lever 100 will automatically be in its disengaged position due to gravity. In order to obtain this inwardly engaged position, shaft 76 slides through spherical bearing 84. After the gears are engaged, knob 78 can be rotated such that lower gear 48 is rotated one way and upper gear 60 is rotated the other way. For example, if thread surface 36 is formed such that clockwise rotation of nut 40 (when viewed from the bottom of router 10) results in upward movement of nut 40, rotation of handle 78 in a counterclockwise direction (when viewed from the end of handle 78) will result in clockwise rotation of gear 48 (and thus nut 40) and counterclockwise rotation of gear 60 (and thus shaft 18). This counter rotation results in upward movement of collet nut 40 and, thus, inward movement of prongs 32 toward shank 24. As is apparent, an operator will "hand tighten" the shank within the arrangement.

When gear 72 is moved to this engaged position, spring 98 is compressed by the reduction in distance between collar 96 and bearing 84. Thus, in this engaged position, shaft 76 is biased outwardly toward a disengaged position.

After collet nut 40 has been adequately tightened, the operator releases all inward pressure on knob 78 and, thus, gear 72 returns to its nonengaged position due to spring 98 expanding from its compressed condition. Further, as shaft 76 moves further outwardly, lockout lever 100 falls downwardly due to gravity and locks knob 78 in an outwardly disengaged position by occupying the space between housing 14 and knob 78. If the router was inverted and is positioned upright to its operating position, lever 100 will also return to its locked position due to gravity. It is apparent that loosening of a bit takes place in the same manner except that pinion gear 72 is rotated in an opposite direction to loosen nut 40.

Arrangement 12 offers numerous advantages over prior securing structures. In particular, arrangement 12 is completely self-contained within housing 14, so that no separate wrenches or tools are required to secure bit 26 to output shaft 18. Further, because shaft 18 is counter rotated with respect to collet nut 40 via gears 48 and 60, there is no need to have a separate output shaft stop device to prevent rotation of the shaft during tightening. Additionally, the counter rotation of shaft 18 and nut 40 results in more efficient and quicker tightening. Still further, the counter rotation of gears 48 and 60 helps ensure that pinion gear 72 is maintained about a single rotating axis and does not require substantial reinforcing structure to stabilize gear 72 and shaft 76.

A further advantage results from the beveled gear surfaces of gears 48 and 60 and the annular beveled envelope 70 formed thereby. More specifically, the engagement of the beveled surfaces of these gears with beveled pinion gear 72 ensures that as collet nut 40 and, thus, gear 48 move up and down along shaft 18, adequate engagement will be maintained between pinion gear 72 and gears 48 and 60. As gear 48 moves downwardly, pinion gear 72 will move inwardly closer to shaft 18 due to pressure applied by the operator to ensure adequate engagement of the relevant gear teeth. Further, the reverse is also true. As gear 48 moves upwardly along shaft 18, pinion gear 72 will move away from shaft 18 but still maintain adequate engagement of gear teeth to continue the rotation of gear 48.

As best shown in FIGS. 1 and 2, it is also preferable to have shaft 76 at an angle to the horizontal surface of plate 16. This horizontal angle ensures that knob 78 is an adequate distance above plate 16 so as to not interfere with workpieces, guard surfaces, or adjusting structures.

It has been found suitable to have gears 48, 60, and 72 and shaft 76 designed as follows:

| Pinion teeth: | 10 | Pitch diameter pinion: | 0.3846 in. |
|---|---|---|---|
| Lower gear teeth: | 42 | Pitch diameter lower gear: | 1.6154 in. |
| Upper gear teeth: | 38 | Pitch diameter uppergear: | 1.4615 in. |
| Diametral pitch: | 26 | | |
| Shaft angle: | 11.5369 Deg | (from horizontal) | |
| Mechanical advantage: | 2.00 | | |
| Pitch angle: | | | |
| Pinion lower gear: | | 13.764 Deg | 0.240 Rad |
| Lower gear: | | 87.773 Deg | 1.532 Rad |
| Pinion Upper gear: | | 13.764 Deg | 0.240 Rad |
| Uppergear: | | 64.700 Deg | 1.129 Rad |

With reference to FIGS. 9 and 10, a second embodiment 102 of the present invention is shown. In arrangement 102, a modified collet nut 104 is utilized. Collet nut 104 includes an upper beveled gear surface 106 and a reduced diameter generally cylindrical portion 108 with a lower annular ridge 110. Nut 104 serves the same function as collet nut 40 in the sense that it has a conical camming surface that pushes the prongs of the collet inwardly to secure the shank of the bit in place. Arrangement 102 also has a pinion gear 72 with an annular gear surface 74 for engaging gear surface 106. Rotation of gear 72 results in rotation of collet nut 104. As is apparent, arrangement 102 does not have a second gear keyed to shaft 18, such that an conventional internal shaft lock must be utilized with this embodiment to prevent rotation of shaft 18 during tightening. Rotation of gear 72 is accomplished through pinion shaft 76 and knob 78. Again, shaft 76 is slidably and rotatably mounted to housing 14 and a spring 98 is used to bias shaft 76 and gear 72 toward a nonengaging position.

Arrangement 102 further has a yoke assembly 112 with a central bore 114 for receiving shaft 76. Shaft 76 can rotate within bore 114 and with respect to yoke 112, but shaft 76 and yoke 112 slide inwardly and outwardly together with respect to housing 14. Yoke 112 further has a general semicircular indentation 116 on one end for engaging reduced diameter cylindrical portion 108 of nut 104, as best shown in FIG. 9. Indentation 116 forms diverging prongs 118 which are disposed on diametrically opposed sides of portion 108 when arrangement 102 is in its engaging position. Prongs 118 serve to ensure that when gear 72 is rotated, it is maintained in a singular location. More specifically, rotation of gear 72 and its engagement with gear surface 106 likely would result in the tendency of gear 72 and, thus, shaft 76 to move into or out of the paper with respect to the drawing in FIG. 9 depending upon the direction of rotation. Prongs 118 disposed on both sides of portion 108 ensure that such movement is impeded and that gear 72 remains in the same position. Thus, prongs 118 reduce the need for substantial mounting structure in housing 14.

In operation, an operator pushes inwardly on knob 78 such that gear 72 engages gear surface 106, and such that indentation 116 receives portion 108. As this is done, spring 98 is compressed. Upon rotation of knob 78, a bit can be secured to the bottom of outlet shaft 18 utilizing a typical collet. For example, if thread surface 36 is formed such that clockwise rotation (when viewed from the bottom of router 10) results in upward movement of nut 104, handle 78 will be rotated in a clockwise direction (when viewed from the end of handle 78) to result in the clockwise rotation of nut 104. After the bit is sufficiently tightened in place, the operator releases pressure on knob 78 and shaft 76 along with yoke 112 will return to their nonengaging positions due to the force of spring 98. Thereafter, the router can be utilized to perform its cutting operations. Loosening of a bit can take place by reversing the rotation of knob 78.

From the foregoing, it will be seen that this invention is one well adapted to obtain all the ends and objects hereinabove set forth, together with other advantages which are obvious and which are inherent to the structure. It will be understood that certain features and subcombinations are of utility and may be employed without reference to other features and subcombinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

We claim:

1. A bit attaching arrangement for a power tool, the power tool having a rotatably driven shaft onto which the bit is attached, the arrangement comprising:
    a bit locking member rotatable with respect to the shaft, said bit locking member having a first gear so that rotation of said first gear causes rotation of said locking member;
    a second gear secured to the shaft so that rotation of said second gear causes rotation of the shaft; and
    a rotatable third gear which engages said first and second gears simultaneously;
    wherein rotation of said third gear results in counter rotation between said bit locking member and the shaft so that securement of the bit to the shaft is accomplished.

2. The arrangement of claim 1 wherein said first, second, and third gears are bevel gears.

3. A bit attaching arrangement for a power tool, the power tool having a rotatably driven shaft onto which the bit is attached, the arrangement comprising:
    a bit locking member rotatable with respect to the shaft, said bit locking member having a first gear so that rotation of said first gear causes rotation of said locking member, the shaft having a second gear so that rotation of said second gear causes rotation of the shaft; and
    a rotatable third gear which engages said first and second gears simultaneously;
    wherein said third gear is positionable between a first position wherein it engages both said first and second gears and a second position wherein it does not engage either of said first or second gears; and
    wherein rotation of said third gear while the third gear is in the first position results in counter rotation between said bit locking member and the shaft so that securement of the bit to the shaft is accomplished.

4. The arrangement of claim 3 wherein said third gear is located on the end of a pinion shaft rotatably mounted to the power tool and rotatably actuatable by a power tool operator.

5. The arrangement of claim 4 wherein said pinion shaft is slidably mounted to the power tool so that sliding movement of said pinion shaft results in said third gear being positionable between its first and second positions.

6. The arrangement of claim 3 wherein said third gear is biased towards its second position.

7. The arrangement of claim 3 further including a lockout structure attached to the power tool for locking said third gear in its second position.

8. The arrangement of claim 1 wherein the shaft has a collet on one end and said locking member is a collet nut that is threadably received on the shaft.

9. The arrangement of claim 1 wherein said locking member and said first gear are press-fitted together.

10. The arrangement of claim 1 wherein said locking member and said first gear are integrally formed.

11. The arrangement of claim 1 wherein said second gear is keyed to the shaft so that rotation of said second gear results in rotation of said shaft.

12. The arrangement of claim 1 wherein said third gear is disposed generally perpendicular to said first and second gears.

13. The arrangement of claim 4 wherein said pinion shaft is disposed at an angle to the longitudinal axis of the shaft.

14. A router having a rotatably driven shaft onto which a bit is attached and rotated therewith through the use of a collet, the arrangement comprising:
    a collet nut threadably engaging the shaft, said collet nut having a first gear so that rotation of said first gear causes rotation of said nut;
    a second gear secured to the shaft so that rotation of said second gear causes rotation of the shaft; and
    a rotatable third gear which engages said first and second gears simultaneously;
    wherein rotation of said third gear results in counter rotation between said collet nut and the shaft so that securement of the bit to the shaft is accomplished.

15. The router of claim 14 wherein said first, second, and third gears are bevel gears.

16. A router having a rotatable driven shaft onto which a bit is attached and rotated therewith through the use of a collet, the arrangement comprising:
    a collet nut threadably engaging the shaft, said collet nut having a first gear so that rotation of said first gear causes rotation of said nut, the shaft having a second gear so that rotation of said second gear causes rotation of the shaft; and
    a rotatable third gear which engages said first and second gears simultaneously;
    wherein said third gear is positionable between a first position wherein it engages both said first and second gears and a second position wherein it does not engage either of said first or second gears; and
    wherein rotation of said third gear while the third gear is in the first position results in counter rotation between said collet nut and the shaft so that securement of the bit to the shaft is accomplished.

17. The router of claim 16 wherein said third gear is located on the end of a pinion shaft rotatably mounted to the router and rotatably actuatable by a router operator.

18. The router of claim 17 wherein said pinion shaft is slidably mounted to the router so that sliding movement of said pinion shaft results in said third gear being positionable between its first and second positions.

19. The router of claim 16 wherein said third gear is biased towards its second position.

20. The router of claim 16 further including a lockout structure attached to the router for locking said third gear in its second position.

21. The router of claim 14 wherein said collet nut and said first gear are press-fitted together.

22. The router of claim 14 wherein said collet nut and said first gear are integrally formed.

23. The router of claim 14 wherein said second gear is keyed to the shaft so that rotation of said second gear results in rotation of said shaft.

24. The router of claim 14 wherein said third gear is disposed generally perpendicular to said first and second gears.

25. The router of claim 17 wherein said pinion shaft is disposed at an angle to the longitudinal axis of the shaft.

26. A router having a rotatably driven shaft onto which a bit is attached through a collet, the arrangement comprising:

a collet nut rotatable with respect to the shaft, said collet nut having a first gear so that rotation of said first gear causes rotation of said nut;

a pinion shaft having a second gear disposed on one end thereof said shaft rotatably and slidably mounted to the router, said shaft having a first position wherein said second gear engages said first gear so that rotation of said shaft will result in rotation of said first gear with respect to the shaft so as to secure the bit to the shaft, and a second position wherein said second gear is disengaged from said first gear; and a yoke associated with said pinion shaft and slidable with respect to the router, said yoke having an indentation formed on one end, said indentation engaging said collet nut when said pinion shaft is in its first position and disengaging said collet nut when said pinion shaft is in its second position, said yoke retaining said second gear in one position relative to the collet nut when said second gear engages said first gear.

27. The router of claim 26 wherein said first and second gears are bevel gears.

28. The router of claim 26 wherein said pinion shaft is biased towards its second position.

29. The router of claim 26 wherein said collet nut and said first gear are integrally formed.

30. The router of claim 26 wherein said second gear is disposed generally perpendicular to said first gear.

31. A bit attaching arrangement for a power tool, the power tool having a rotatably driven shaft onto which the bit is attached, the arrangement comprising:

a bit locking member rotatable with respect to the shaft;

a first rotatable gear, wherein rotation of said first gear causes rotation of said bit locking member; and a second gear, wherein rotation of said second gear causes rotation of the shaft;

wherein said first and second gears are counter rotated to result in securement of the bit to the shaft.

32. The arrangement of claim 31 wherein said first and second gears are bevel gears.

33. The arrangement of claim 31 further including a third gear which engages said first and second gears simultaneously, wherein rotation of said third gear results in said counter rotation.

34. The arrangement of claim 31 wherein the shaft has a collet on one end and said locking member is a collet nut that is threadably received on the shaft.

35. The arrangement of claim 31 wherein said locking member and said first gear are press-fitted together.

36. The arrangement of claim 31 wherein said locking member and said first gear are integrally formed.

37. The arrangement of claim 31 wherein said second gear is keyed to the shaft so that rotation of said second gear results in rotation of said shaft.

38. A method of attaching a bit to a power tool, the power tool having a rotatably driven shaft onto which the bit is attached, a bit locking member rotatable with respect to the shaft, the bit locking member having a first gear that rotates with the bit locking member and the shaft having a second gear that rotates with the shaft, the method comprising:

rotating the first gear in one direction to rotate the bit locking member; and rotating the second gear in an opposite direction to rotate the shaft, the counter rotation between said bit locking member and said shaft resulting in securement of the bit to the shaft.

39. The method of claim 38 wherein the power tool further includes a third gear for simultaneously engaging said first and second gears, the method further comprising rotating said third gear so as to result in the counter rotation between said bit locking member and the shaft.

40. The method of claim 39, further comprising the step of shifting the third gear between a first position in which it engages both the first and second gears and a second position in which it does not engage either of the first or second gears.

* * * * *